United States Patent [19]

Murphy

[11] Patent Number: 5,069,800

[45] Date of Patent: Dec. 3, 1991

[54] CHEMICAL PROCESS FOR THE DENITRIFICATION OF WATER

[75] Inventor: Andrew P. Murphy, Littleton, Colo.

[73] Assignee: The United States of America as represented by the Secretary of the Interior, Washington, D.C.

[21] Appl. No.: 570,749

[22] Filed: Aug. 22, 1990

[51] Int. Cl.$^5$ .............................. C02F 1/70; C02F 1/58
[52] U.S. Cl. .................................... 210/757; 210/903; 210/749
[58] Field of Search ............... 210/749, 757, 758, 903; 423/395, 397

[56] References Cited

U.S. PATENT DOCUMENTS

| | | | |
|---|---|---|---|
| 3,617,579 | 11/1971 | Gunderloy, Jr. | 210/903 |
| 3,673,086 | 6/1972 | Drobnik | 210/757 |
| 4,642,192 | 2/1987 | Heskett | 210/757 |

FOREIGN PATENT DOCUMENTS 120943  9/1979  Japan .................................. 210/903

OTHER PUBLICATIONS

"Chemical Reduction of Nitrate in Water", *Journal WPCF*, vol. 36, No. 3, Mar. 1964, pp. 395–398, G. K. Young et al.

*Primary Examiner*—Stanley S. Silverman
*Assistant Examiner*—Neil M. McCarthy
*Attorney, Agent, or Firm*—E. Philip Koltos

[57] ABSTRACT

A chemical process for the denitrification of water comprising treating water with a metal sufficiently electropositive to decompose the water while regulating the pH within a range effective to permit efficient reduction of nitrate ion. The pH is regulated with alkali in a manner that avoids metal oxide formation and loss of metal by decomposition of water and results in the selective reduction of nitrate ion in the presence of sulfate and chloride ions.

4 Claims, No Drawings

CHEMICAL PROCESS FOR THE DENITRIFICATION OF WATER

The invention described herein was made by an employee of the U.S. Government and may be manufactured and used by or for the Government for Governmental purposes without the payment of any royalties thereon or therefore.

BACKGROUND OF THE INVENTION

1. Field of the invention

The invention relates to a chemical process for denitrification of water and, more particularly, to a process for selective denitrification of water in the presence of sulfate ions.

2. Background of the prior art

The importance of a water treatment process for the removal of nitrate ion is evident from the many problems with which it is associated. From a health standpoint, the medical literature documents excess levels of nitrate ions as a proximate cause of methemoglobinemia, a disease of the newborn, and suggests a potential link between nitrate ion and stomach cancer in humans. Aside from health considerations, nitrate pollution is responsible for poisoning lakes and rivers with resulting harm to fish and other aquatic life and causing algae "blooms", a direct result of the nutrient function of nitrogen. Profusion of the algae "blooms" may serve as an obstacle impeding the flow of water traffic and may pose a significant problem in reservoir storage.

Prior art techniques and processes for denitrification of water fall into three basic categories: biological, desalting, and chemical.

There are numerous biological treatments for effecting denitrification of water. The disadvantages relative to chemical methods are slow reaction times, large holding tanks, and decreased biological oxygen demand (BOD), a measure of the biodegradable organic content of the water. Also, biological organisms essential for such processes cannot survive high TDS waters such as certain brine streams.

Conventional desalting techniques such as reverse osmosis, ion-exchange, and electrodialysis, although efficient in many respects, invariably are too expensive in many applications, particularly where the volume of natural or reclaimed water to be treated is large and a cheap source of electricity is not available. For the most part, conventional desalting techniques lack specificity for nitrate relative to chloride or sulfate. This can be an important cost consideration.

Chemical processes for denitrification of water have involved treatment with various reactive metals and compounds. These reactions can be understood to produce nascent hydrogen which can then act as a reducing agent for anions such as nitrate.

A process which falls into this category is that disclosed in U.S. Pat. No. 3,617,579. In this process a partial denitrification is achieved by treating a dilute nitrate ion aqueous solution with ferrous ion in the presence of a catalytic quantity of cupric ion at an initial pH between 7 and 11. The patent teaches that the pH in general drops during the course of the reaction and should be adjusted preferably to a value between 7 and 9 by, for example, the use of lime or sodium hydroxide. The preferred source of ferrous ion is stated as ferrous sulfate. The patent also teaches that any source of cupric ion catalyst may be employed and cites cupric sulfate as an example. While the exact pressure and temperature is not regarded as critical, the patent does teach that anaerobic conditions are preferred to avoid oxidation of the ferrous ion by air. Absent anaerobic conditions, extra ferrous ion is required to compensate for the degree of oxidation that occurs.

Another process in the category of chemical denitrification is that disclosed in U.S. Pat. No. 4,642,192. This patent relates to the treatment of water, particularly drinking water, with a metal particulate matter such as aluminum, iron, steel, zinc, or copper, or mixtures or alloys thereof, to provide removal of undesirable contaminants such as chlorine and nitrates. The metal particulate matter is selected on the basis of its redox potential relative to the redox potential of the undesirable constituent such that it favors a spontaneous oxidation-reduction reaction between the metal and the undesirable constituent. The patent teaches regulating the pH of the fluid prior to treatment to enhance the removal of contaminants having pH dependent oxidation-reduction activities. Specific examples disclosed in the patent show that the patented process effected a decrease in the level of dissolved nitrates in water when the fluid medium was at least slightly acidic such as having a pH of 6.5 or less.

The prior art chemical processes for denitrifying water are generally attended by a number of disadvantages. For example, the use of ferrous hydroxide as a reductant, as taught by U.S. Pat. No. 3,617,579, shows appreciable decrease in reaction rate due to dissolved oxygen. In order to compensate for this decrease, the patentee advocates conducting the reaction at anaerobic conditions, thus necessitating high capital equipment costs since the reaction must be conducted in a closed container under an inert gas, such as nitrogen or helium. Absent anaerobic conditions, the patentee must employ added reductant, thereby adding to the chemical costs of the process.

In many prior art processes the treatment produces a precipitate or sludge as a by product. This presents a disposal problem with its attendant costs. Where the disposal relates to hazardous waste the problem is compounded.

A further disadvantage of many prior art processes is the need for additional water treatment steps. In this regard, the introduction of ferrous ion in the process of U.S. Pat. No. 3,617,579 may very well exceed the maximum contaminant level for iron and copper in drinking water as specified by the U.S. Environmental Protection Agency, thereby necessitating the added expense of removal of these two elements.

SUMMARY OF THE INVENTION

Accordingly, a principle object of the present invention is to provide a chemical process for denitrification of water which utilizes a metal sufficiently electropositive to decompose water within a pH range such that efficient reduction of nitrate ion is accomplished with minimal loss of metal reductant to the decomposition of water.

Another object of the invention is to provide a chemical process for denitrification of water which utilizes aluminum as a specific electropositive reductant within a pH range that provides efficient reduction of nitrate ion and utilizes hydroxide to regulate the pH level and formation of aluminum oxide on the aluminum particles.

A further object of the invention is to provide a chemical process for denitrification of water which utilizes a metal sufficiently electropositive to decompose water within a pH range such that nitrate is selectively reduced in the presence of sulfate and chloride ions.

Other objects and advantages of the invention will be apparent to those skilled in the art upon reference to the following detailed description and the specific examples.

DESCRIPTION OF THE PREFERRED EMBODIMENT OF THE INVENTION

The present invention relates to a chemical process for denitrification of water wherein natural or reclaimed water is treated with a metal sufficiently electropositive to decompose water while regulating the pH within a range effective to permit efficient reduction of nitrate ion, i.e., selective reduction of nitrate ion in the presence of sulfate and chloride ions. While it is preferred to employ the metal in powder form to take advantage of maximum surface area, thereby facilitating chemical reaction, such form is not critical. The metal of choice is aluminum since compared to the ferrous hydroxide process it shows no appreciable decrease in reaction rate due to dissolved oxygen. Regulation of pH is essential to insure that some of the surface aluminum oxide formed is dissolved, thereby exposing the elemental metal for further reduction of nitrate and maximizing the efficient utilization of reductant. Regulation of oxygen may be required to control surface oxide coating because this may determine ratios of nitrogen to ammonia formed. Regulation of pH may be readily accomplished by the addition of an alkali, such as sodium hydroxide. However, it is important that the alkali be added at a slow enough rate that the efficiency of the reduction of nitrate ion is not compromised by loss of metal reductant. In the case of aluminum the loss may be shown by the following reaction:

$$2Al + 2NaOH + 2H_2O \rightarrow 2NaAlO_2 + 3H_2 \quad (1)$$

while the nitrate reduction reaction proceeds.

The foregoing detailed description of the invention and the following specific examples are for the purpose of illustration only, and are not intended as limiting the scope of the appended claims.

EXAMPLE 1

Approximately 450 ml of 100 p.p.m. of chloride, nitrate, and sulfate solution is added to a 500-ml beaker. The pH is adjusted and maintained by an autotitrator (1 M NaOH titrant) to the values indicated for each of the three tables below. A 1-gram sample of 350-mesh size aluminum powder is added to each beaker and a stop watch is used to determine sampling time. A teflon bar was used to keep the mixture stirred. A syringe is used to withdraw about 10 ml of sample at the required sampling time. This 10-ml sample is immediately filtered through 0.45-micron membrane and analyzed by ion chromatography for the three anions. Chloride concentration does not change during the reaction and is not included in the tables below. The aluminum reductant is not consumed by chloride ion.

All subsequent tables present sampling times in minutes. Nitrate, sulfate, and aluminum are in p.p.m. for all tables.

| pH 8.00 | | | pH 10.25 | | | pH 11.5 | | |
|---|---|---|---|---|---|---|---|---|
| Time | $NO_3^-$ | $SO_4^{-2}$ | Time | $NO_3^-$ | $SO_4^{-2}$ | Time | $NO_3^-$ | $SO_4^-$ |
| 0 | 100 | 100 | 0 | 100 | 100 | 0 | 100 | 100 |
| 2 | 100 | 100 | 2 | 81 | 100 | 2 | 75 | 90 |
| 6 | 99 | 98 | 6 | 40 | 100 | 6 | 51 | 64 |
| 8 | 97 | 99 | 8 | 34 | 99 | 8 | 44 | 55 |
| 10 | 100 | 100 | 10 | 28 | 97 | 10 | 41 | 40 |

Data in the previous example show selective removal of nitrate relative to sulfate at pH 10.25. At pH of 8.00, the water is not sufficiently alkaline to start to dissolve the protective oxide layer on the aluminum particles, and little reaction occurs. At the high pH of 11.5, the aluminum is reacting similar to reaction 1. This is undesirable because there is no selectivity for nitrate over sulfate and because the aluminum is consumed decomposing water to hydrogen.

Data in example 1 show a preferred pH and a reaction that is very fast relative to biological processes.

EXAMPLE 2

The following data were generated using identical procedures as in example 1 except either air or helium gas was bubbled through the solution with a gas dispersion tube and the reactor was sealed at the top except for a small hole for the purge gas to escape. The pH for the following experiments was 9.5.

| Air | | | Helium | | |
|---|---|---|---|---|---|
| Time | $NO_3^-$ | $SO_4^{-2}$ | Time | $NO_3^-$ | $SO_4^{-2}$ |
| 0 | 100 | 100 | 0 | 100 | 100 |
| 2 | 100 | 99 | 2 | 90 | 99 |
| 6 | 57 | 98 | 6 | 56 | 98 |
| 8 | 53 | 100 | 8 | 49 | 97 |
| 10 | 55 | 100 | 10 | 44 | 95 |

These data show that dissolved oxygen or air does not seem to affect the rate of nitrate reduction. In fact, oxygen or air may be needed to limit ammonia production.

EXAMPLE 3

The following data show the reaction to be independent of sulfate ion. Identical conditions to example 1 were used except additional solutions with different sulfate to nitrate ratios were required. The pH for these runs was 10.5, and samples were collected after 15 minutes.

| Initial $NO_3^-$ | Final $NO_3^-$ | Initial $SO_4^{-2}$ | Final $SO_4^{-2}$ |
|---|---|---|---|
| 100 | 26 | 0 | 0 |
| 100 | 28 | 50 | 50 |
| 100 | 24 | 100 | 100 |
| 100 | 23 | 200 | 200 |

EXAMPLE 4

The following data show that aluminum consumption in the reaction is a critical function of both pH and how the reaction is allowed to progress. The following experiments were identical to example 1 except additional 0.45-micron filtered samples were taken for aluminum analyses. Air and dissolved oxygen were partially removed from the reaction by helium gas. Data in Case 2 were collected by manually adjusting pH to near 10, allowing the reaction to proceed (the pH decreases as the reaction continues), waiting a few minutes after the pH has stopped decreasing, and then adjusting the pH to near 10 again. Case 1 data support the theory that much aluminum is being consumed decomposing water rather than reducing nitrate. Case 2 shows that when the alkali (in this case 1 M NaOH) is added at a slower rate, the consumption of aluminum is much less. This is a very significant result because aluminum reductant is required to reduce nitrate. This makes the process more cost-effective.

| Case 1 pH 10.5 | | | Case 2 pH 10.0 to 9.0 | | |
|---|---|---|---|---|---|
| Time | $NO_3^-$ | Al | Time | $NO_3^-$ | Al |
| 0 | 100 | 0 | 0 | 100 | 1 |
| 1 | 98 | 20 | 10 | 84 | 12 |
| 2 | 74 | 75 | 20 | 71 | 16 |
| 3 | 55 | 127 | 30 | 58 | 22 |
| 5 | 49 | 206 | 50 | 36 | 36 |
| 7 | 48 | 267 | 70 | 30 | 41 |

From the foregoing examples, it is clear that the inventive process may be used to remove nitrate from any nitrate solution such as primary, secondary, or tertiary sewage effluent and can be used to treat agricultural waste waters. The process produces the aluminate ion which after pH adjustment precipitates as aluminum oxide. At this point, if there is phosphate present in the water, partial removal can be expected because of the formation of insoluble complexes with aluminum oxide. Thus, both common nutrients (nitrate and phosphate) are removed. This is to be considered another advantage of the process.

Depending on operating conditions, the products of the reduction of nitrate can be expected to be nitrogen gas and/or nitrite and ammonia.

A balanced chemical reaction, based on data from example 4 case 2, supports reaction 2 and not reaction 3 or 4:

$$10Al + 4NaOH + 6NaNO_3 \rightarrow 10NaAlO_2 + 3N_2 + 2H_2O \quad (2)$$

$$8Al + 3NaNO_3 + H_2O \rightarrow 8NaAlO_2 + 3NH_3 \quad (3)$$

$$2Al + 2NaOH + 3NaNO_3 \rightarrow 3NaNO_2 + NaAlO_2 + H_2O \quad (4)$$

This can be shown by comparing the theoretical ratios of $Al/NO_3^-$ with the experimentally determined value of 1.3.

| Reaction | Theoretical $Al/NO_3^-$ Ratio |
|---|---|
| 2 | 1.67 |
| 3 | 2.67 |
| 4 | 0.67 |

Therefore, the product of the reaction is probably innocuous nitrogen gas. Increasing oxygen in the reaction may increase the yield of nitrogen to ammonia.

As suggested heretofore, aluminum particles of various sizes may be employed in the practice without departing from its spirit and scope. Larger particles with faster settling rates may be preferred in one case or extremely fine particles (more surface area and therefore faster reaction rates) may be preferred in another case. Extremely fine colloidal particles could be generated with a device such as the Bredig arc.

Treatment of nitrate polluted waters can be achieved with this invention by pumping a slurry of fine aluminum particles downhole. Such an in situ treatment can be very effective.

Lime or other sources of hydroxide ion may be substituted for sodium hydroxide in regulating the pH of the water being treated by the inventive process. The reduction medium (aluminum powder at the proposed pH) may be useful for the removal of dissolved oxygen from the water.

Additional embodiments and advantages within the scope of the claimed invention will be apparent to those skilled in the art.

What is claimed is:

1. A chemical process for denitrification of water containing nitrate, sulfate and chloride ions by selectively reducing the nitrate ions comprising: regulating of said water between about 8.5 to about 11 with an alkali and adding a metal sufficiently electropositive to permit reduction of the nitrate ions to nitrogen or ammonia without consuming said metal by decomposing water to hydrogen.

2. The process of claim 1, wherein the metal is aluminum.

3. The process of claim 1, wherein oxygen or air is introduced to control surface oxide formation on the aluminum.

4. The process according to claim 3 wherein the alkali is selected from sodium hydroxide or lime.

* * * * *